(12) United States Patent
Liu et al.

(10) Patent No.: US 8,591,362 B1
(45) Date of Patent: Nov. 26, 2013

(54) MECHANICALLY SYNCHRONIZED ACTUATOR AND METHODS FOR SYNCHRONIZING

(71) Applicant: GE Aviation Systems LLC, Grand Rapids, MI (US)

(72) Inventors: Shijie Liu, Morris Plains, NJ (US); Douglas Jerome Campbell, Martinsville, NJ (US); Almir Oliveira Bolina, Arcadia, CA (US)

(73) Assignee: GE Aviation Systems LLC, Grand Rapids, MI (US)

( * ) Notice: Subject to any disclaimer, the term of this patent is extended or adjusted under 35 U.S.C. 154(b) by 0 days.

(21) Appl. No.: 13/666,400

(22) Filed: Nov. 1, 2012

(51) Int. Cl.
*F16H 3/72* (2006.01)

(52) U.S. Cl.
USPC ............................................................ 475/5

(58) Field of Classification Search
USPC ................................................. 475/2, 5, 151
See application file for complete search history.

(56) References Cited

U.S. PATENT DOCUMENTS

| | | | |
|---|---|---|---|
| 2008/0045365 A1* | 2/2008 | Usoro | 475/5 |
| 2008/0058145 A1* | 3/2008 | Holmes | 475/5 |
| 2011/0136607 A1* | 6/2011 | Samie et al. | 475/2 |

* cited by examiner

*Primary Examiner* — Edwin A Young
(74) *Attorney, Agent, or Firm* — McGarry Bair PC

(57) ABSTRACT

An actuator having a first actuating channel, having a first motor, and a second actuating channel having a second motor where the output of the first actuating channel and the output of the second actuating channel are synchronized and methods of mechanically synchronizing two outputs of a two channel actuator.

16 Claims, 5 Drawing Sheets

US 8,591,362 B1

MECHANICALLY SYNCHRONIZED ACTUATOR AND METHODS FOR SYNCHRONIZING

BACKGROUND OF THE INVENTION

Some tasks require an actuator with two motors having two synchronized outputs without using feedback devices or the feedback devices are not accurate enough to achieve such goal. However, no two motors behave exactly the same and this provides a challenge to synchronizing the two outputs mechanically from two different drives.

BRIEF DESCRIPTION OF THE INVENTION

In one embodiment, the invention relates to an actuator including a first actuating channel having a first planetary gear system, with a first sun gear and a first ring gear, and a first motor driving the first sun gear, a second actuating channel having a second planetary gear system, with a second sun gear and a second ring gear, and a second motor driving the second sun gear, a first gear train coupling the first motor to the second ring gear to drive the second ring gear in addition to the first sun gear, and a second gear train coupling the second motor to the first ring gear to drive the first ring gear in addition to the second sun gear, wherein the first motor driving both the first sun gear and the second ring gear in combination with the second motor driving both the second sun gear and the first ring gear mechanically synchronizes the first and second actuating channels.

In another embodiment, the invention relates to a method of mechanically synchronizing two outputs of a two channel actuator, having a first actuating channel with a first driver and a second actuating channel with a second driver, including linking an output of a first motor and a ring gear of the second channel with a linkage, linking an output of a second motor and a ring gear of the first channel with a linkage, and rotating the drivers in the same direction to synchronize the two outputs.

DESCRIPTION OF EMBODIMENTS OF THE INVENTION

Figure 1A:
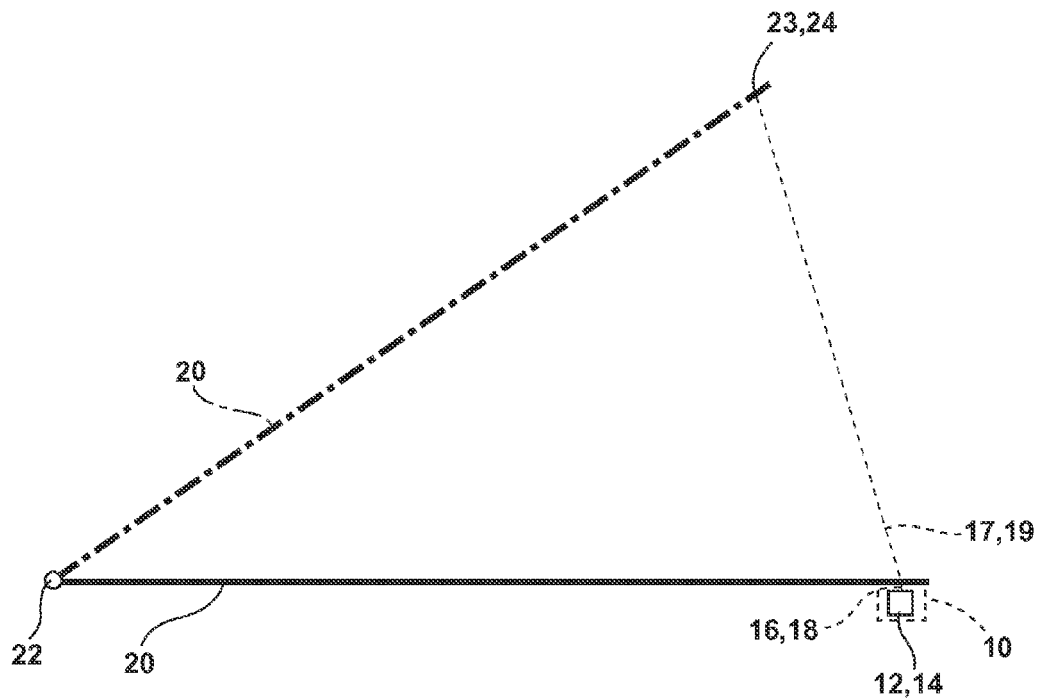
FIGS. 1A and 1B are schematic views of an example where an actuator having two synchronized outputs would be beneficial.
Figure 1B:
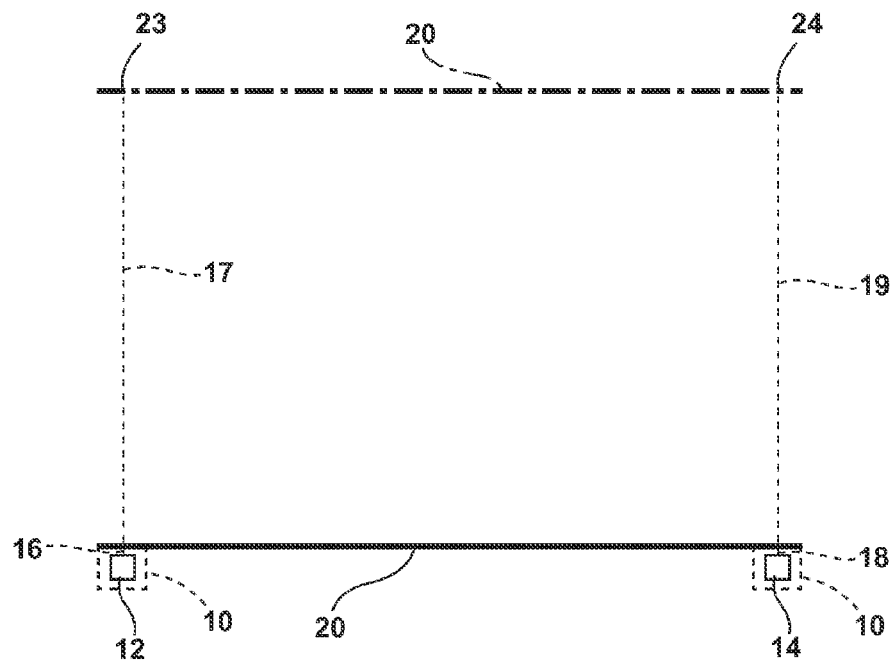

FIG. 1A illustrates an example in which an actuator 10 having a first driver 12 and a second driver 14 with two synchronized outputs 16 and 18 may prove useful. In the illustrated example, a member 20, such as for example a transportable radar antenna, may be pivotally secured at a first end 22. The outputs 16 and 18 may be coupled to linearly extendable members 17 and 19 which, may be operably coupled to a second end of the member 20 at either of its sides 23 and 24. As illustrated more clearly in FIG. 1B, the outputs 16 and 18 and linearly extendable members 17 and 19 may be spaced apart at the second end of the member 20 at the sides 23 and 24. The actuator 10 may be used to raise the member 20. The above example may require that the two outputs 16 and 18 be within twenty thousandths of an inch between each other so that the member 20 is not twisted or broken as it is raised. It will be understood that the above example is just one environment for embodiments of the invention. Embodiments of the invention need not be implemented in a hinged structure. By way of a further non-limiting example, embodiments of the invention may be used for raising and lowering a surface.

Figure 2:
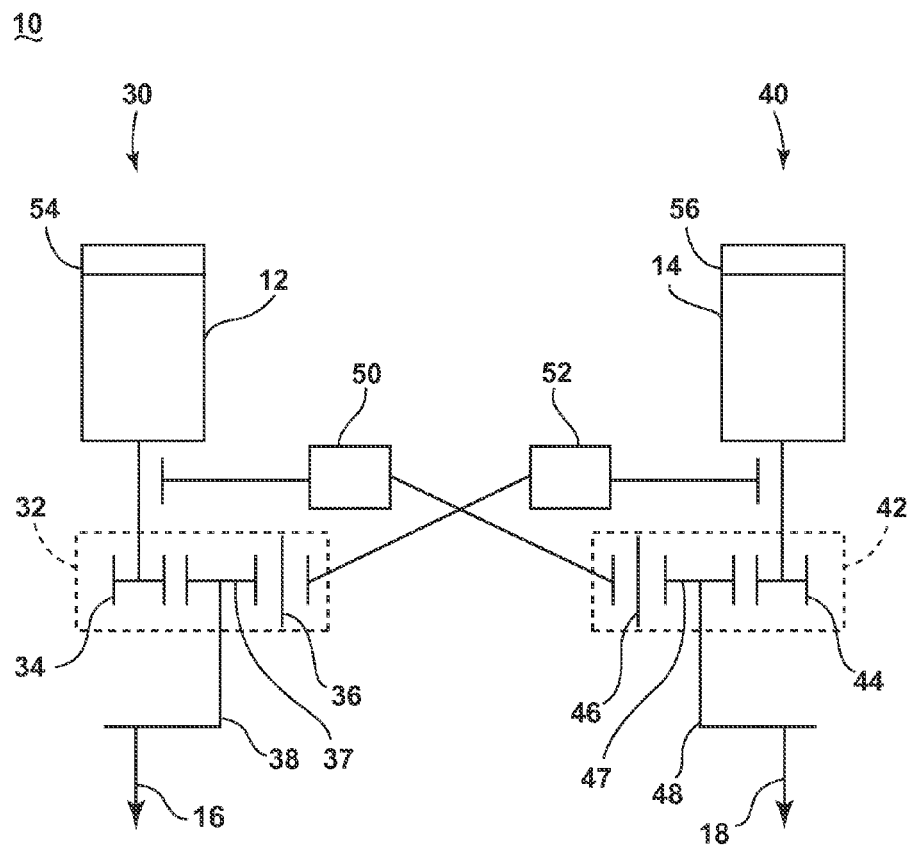
FIG. 2 is a schematic illustration of an actuator with two synchronized outputs according to an embodiment of the invention.

FIG. 2 schematically illustrates an exemplary actuator 10 according to an embodiment of the invention. The actuator 10 includes a first actuating channel 30 having the first driver 12 and a first planetary gear system 32. The first driver 12 may be any suitable driver including an electric motor. The first planetary gear system 32 may include a first sun gear 34 and a first ring gear 36. The first planetary gear system 32 may also include any suitable number of planet gears 37. The first planetary gear system 32 may also include a planet gear carrier 38, which is coupled to the output 16. In the illustrated example, the first driver 12 is operably coupled to the first sun gear 34.

A second actuating channel 40 having the second driver 14 and a second planetary gear system 42 is also included. The second driver 14 may be any suitable driver including an electric motor. The second planetary gear system 42 may include a second sun gear 44 and a second ring gear 46. The second planetary gear system 42 may also include any suitable number of planet gears 47. The second planetary gear system 42 may also include a planet gear carrier 48, which is coupled to the output 18. In the illustrated example, the second driver 14 is operably coupled to the second sun gear 44. The first planetary gear system 32 and the second planetary gear system 42 are an identical size and have identical gear ratios. The first and second planetary gear systems 32 and 42 may be the same or similar as that described in FIG. 3.

A first gear train 50 may couple the first driver 12 to the second ring gear 46. In this manner, the first driver 12 may drive the second ring gear 46 as well as the first sun gear 34. Similarly, a second gear train 52 may couple the second driver 14 to the first ring gear 36 such that the second driver 14 may drive the first ring gear 36 in addition to the second sun gear 44. The first and second gear trains 50, 52 may comprise one or more gearing stages that are enmeshed with the corresponding ring gear of one actuating channel and the sun gear of the other actuating channel. The first gear train 50 and the second gear train 52 may have an even or odd number of meshes. They may have the same or a different number of meshes. The first gear train 50 and the second gear train 52 shall have an identical gear ratio. The gear ratio shall equal to the number of sun teeth over the number of the ring teeth.

Two braking mechanisms may be included in the actuator 10 and may be configured to brake at least one of the first driver 12 and the second driver 14 upon failure of the at least one of the first driver 12 and the second driver 14. For example, a fail-safe mechanism 54 has been illustrated as being operably coupled with the first driver 12 and a second fail-safe mechanism 56 has been illustrated as being operably coupled with the second driver 14. In this manner, the fail-safe mechanism 54 may brake the first driver 12 upon failure to lock the first sun gear 34 and the fail-safe mechanism 56 may brake the second driver 14 upon failure to lock the second sun gear 44. Any suitable mechanical braking or electro-mechanical mechanism(s) may be used.

In operation, where the first and second gear trains 50, 52 have an even mesh arrangement, the first driver 12 and the second driver 14 operate in the same direction. The first driver 12 drives both the first sun gear 34 and the second ring gear 46 in combination with the second driver 14 driving both the second sun gear 44 and the first ring gear 36. This results in mechanically synchronizing the first and second actuating channels 30 and 40 with the outputs 16 and 18 running in a same direction. The first and second actuating channels 30 and 40 are synchronized even if a speed of the first driver 12 and a speed of the second driver 14 are different. Further, the first and second actuating channels 30 and 40 are synchronized even if a reflected load at the first driver 12 and a reflected load at the second driver 14 are different.

In operation, where the first and second gear trains 50, 52 have an odd mesh arrangement, the first driver 12 and the second driver 14 operate in opposite directions. The first driver 12 drives both the first sun gear 34 and the second ring gear 46 in combination with the second driver 14 driving both the second sun gear 44 and the first ring gear 36. This results in mechanically synchronizing the first and second actuating channels 30 and 40 with the outputs 16 and 18 running in opposite directions. The first and second actuating channels 30 and 40 are synchronized even if a speed of the first driver 12 and a speed of the second driver 14 are different. Further, the first and second actuating channels 30 and 40 are synchronized even if a reflected load at the first driver 12 and a reflected load at the second driver 14 are different.

During a failure mode, wherein one of the first and second drivers 12 and 14 ceases to operate, the fail-safe mechanisms 54 and 56 may be used to stop the rotation of the failed motor. In this manner, the still operating motor may be used to drive both outputs 16 and 18. Because the first and second drivers 12 and 14 operate in an active-active fashion, if one drive or gear train between the channels does not work, the actuator 10 still will have a synchronized output.

Figure 3:
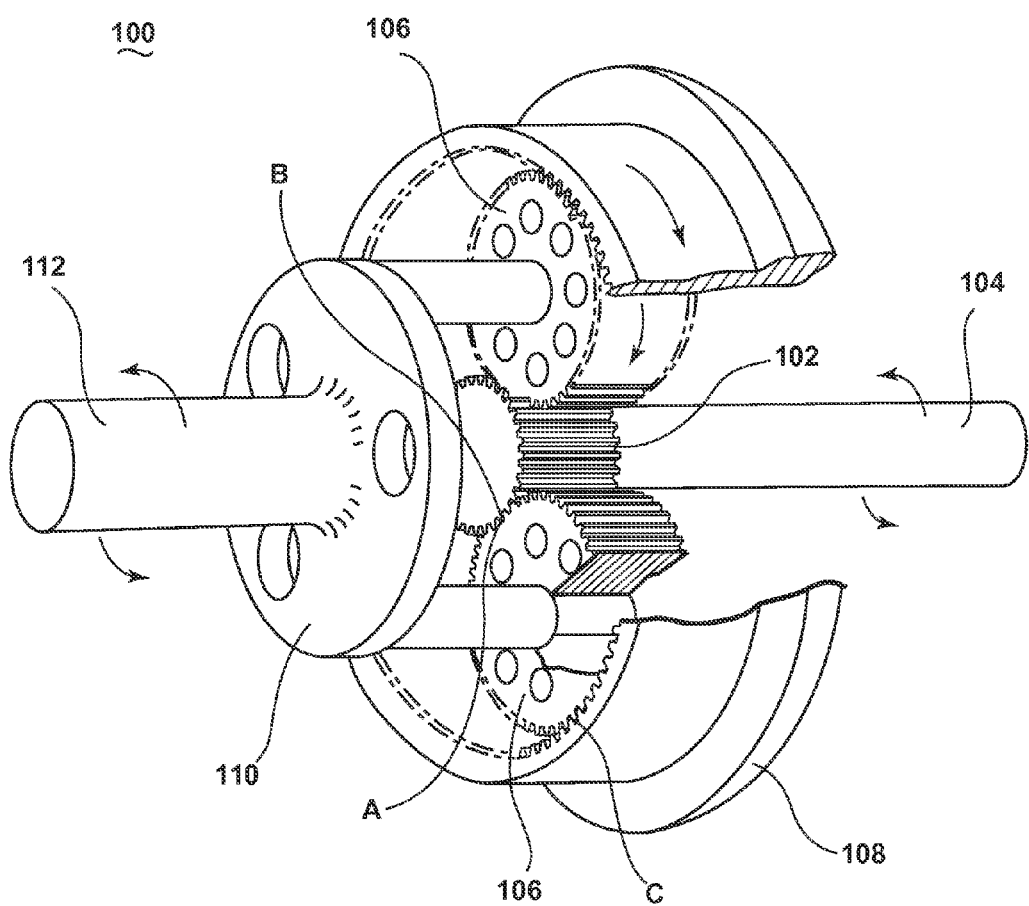
FIG. 3 is an exemplary planetary gear system that may be used in the actuator illustrated in FIG. 2.

A description of the basic workings of a planetary gear system as well as the linking gear trains may prove useful to understanding the ability to mechanically synchronize the first and second actuating channels 30 and 40 in this manner. FIG. 3 non-schematically illustrates an exemplary planetary gear system 100, which illustrates an exemplary planetary gear system that may be used with the actuator 10 described above. The planetary gear system 100 includes a sun gear 102 (such as 34 or 44 in FIG. 2), which may be driven by a motor output 104 (such as 12 or 14 in FIG. 2), several planetary gears 106 (such as 37 or 47 in FIG. 2), a ring gear 108 (such as 36 or 46 in FIG. 2), and a planet carrier 110 (such as 38 or 48 in FIG. 2), which may be coupled with an output 112 (such as 16 or 18 in FIG. 2). The sun gear 102 is encircled by the ring gear 108 and three planetary gears 106 enmeshed between the sun gear 102 and the ring gear 108 and rotationally supported on a planet carrier 110. In the illustrated example, the motor output 104 drives the sun gear 102 and the output 112 is driven by the planet carrier 110. The sun gear 102, ring gear 108, and planet carrier 110 are all free to rotate. Rotational arrows have been included as one possible way in which the planetary gear system 100 may rotate.

In the illustrated example, the sun gear 102 and the ring gear 108 are the driving elements. The sun gear 102 and the ring gear 108 may drive in the same directions or the sun gear 102 and the ring gear 108 may drive in opposite directions. When the sun gear 102 and the ring gear 108 drive in the same direction, the planet carrier 110 rotates in the same direction as the sun gear 102 and the ring gear 108. When the sun gear 102 and the ring gear 108 drive in opposite directions, there may be one of two results. First, the planet carrier 110 may rotate in the same direction as the sun gear 102. Second, the planet carrier 110 may rotate in the opposite direction as the sun gear 102, which is the same direction as the rotation of the ring gear 108. This depends on the output power of the sun gear 102 and the ring gear 108. The rotating elements in each of the arrangements above have a distinct speed and torque relationship. In order to define the planet carrier angular velocity in the planetary gear system 100, the angular velocity of sun gear and ring gear must be specified.

Figure 4:
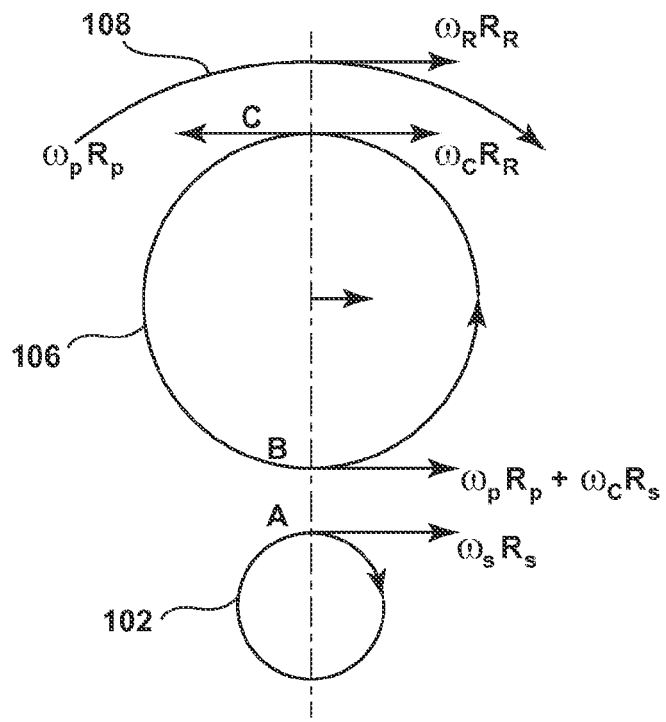
FIG. 4 schematically illustrates a speed relationship of the gear train of FIG. 3.

When the sun gear 102 and the ring gear 108 drive in the same directions, the planetary gears 106 may rotate in either direction depending on the power of the sun gear 102 and the ring gear 108. However, the planet carrier 110 always rotates in the same direction as the sun gear 102 and the ring gear 108. For example, assume that the sun gear 102 and the ring gear 108 rotate in clockwise direction and that the sun gear 102 has more power than the ring gear 108. In such an instance the planetary gears 106 run counter-clockwise. The speed relationships of the planetary gear system 100 may be derived in the following manner. As schematically illustrated in FIG. 4, point A on the pitch diameter of the sun gear 102 has a tangential velocity of $\omega_s R_s$. The point A on the sun gear 102 is meshing with a point B on the planetary gear 106 gear pitch diameter which has a tangential velocity made up of two components, $\omega_p R_p + \omega_c R_s$. Since point A on the sun gear 102 meshes with point B on the planetary gear 106, they must have the same tangential velocities, therefore:

$$\omega_s R_s = \omega_p R_p + \omega_c R_s \tag{1}$$

For point C on the planetary gear 106 and the ring gear 108, equation may be written as:

$$\omega_R R_R = \omega_c R_R - \omega_p R_p \tag{2}$$

Combining equations (1) and (2), the planet carrier 110 speed may be solved for as:

$$\omega_c = \frac{R_s}{R_s + R_R}\omega_s + \frac{R_R}{R_s + R_R}\omega_R \tag{3}$$

Equation (3) also applies when the ring gear 108 has more power than the sun gear as well as when the sun gear 102 and the ring gear 108 run in the counter-clockwise direction.

Figure 5:
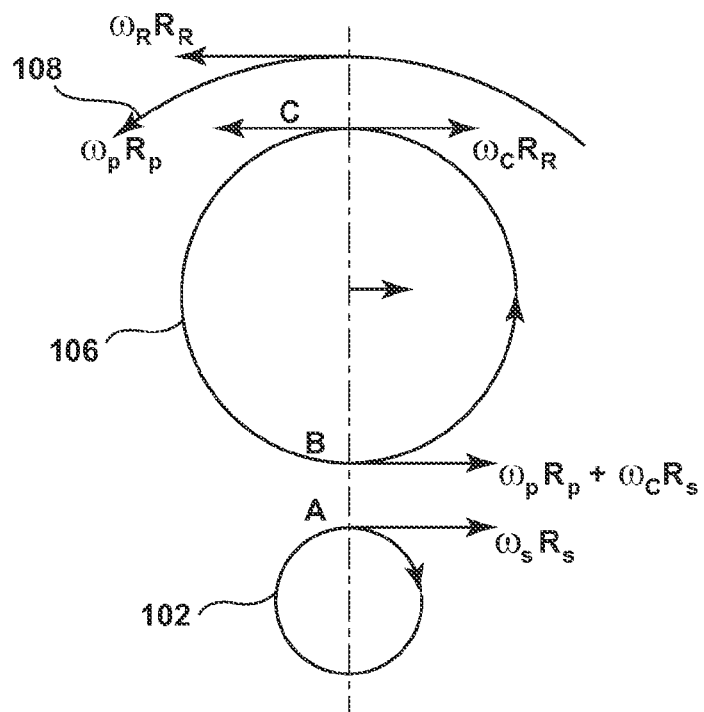
FIG. 5 schematically illustrates a speed relationship of the gear train of FIG. 3.

When the sun gear 102 and the ring gear 108 drive in the opposite directions, the planet carrier 110 may rotate in either direction depending on the power of the sun gear 102 and the ring gear 108. However, the planetary gears 106 always rotate in ring gear's direction. For example, if the sun gear 102 rotates in a clockwise direction, the ring gear 108 rotates in a counter-clockwise direction, and as a result the planetary gears 106 run in a counter-clockwise direction. Assuming that the sun gear 102 has more power than the ring gear 108, the planet carrier 110 runs in a clockwise direction. As schematically illustrated in FIG. 5, the speed relationships of the gear train can be derived as a point A on the pitch diameter of the sun gear 102 has a tangential velocity of $\omega_s R_s$. The point A on the sun gear 102 pitch diameter is meshing with a point B on the planetary gear 106 pitch diameter which has a tangential velocity made up of two components, $\omega_p R_p + \omega_c R_s$. As point A on the sun gear 102 meshes with point B on the planetary gear 106, they must have the same tangential velocities, therefore:

$$\omega_s R_s = \omega_p R_p + \omega_c R_s \tag{4}$$

The equation may be written for point C on the planetary gear 106 and the ring gear 108:

$$\omega_R R_R = \omega_p R_p - \omega_c R_R \tag{5}$$

Combining equation (4) and (5), the general speed ratio equation is:

$$\omega_c = \frac{R_s}{R_s + R_R}\omega_s - \frac{R_R}{R_s + R_R}\omega_R \quad (6)$$

Figure 6:
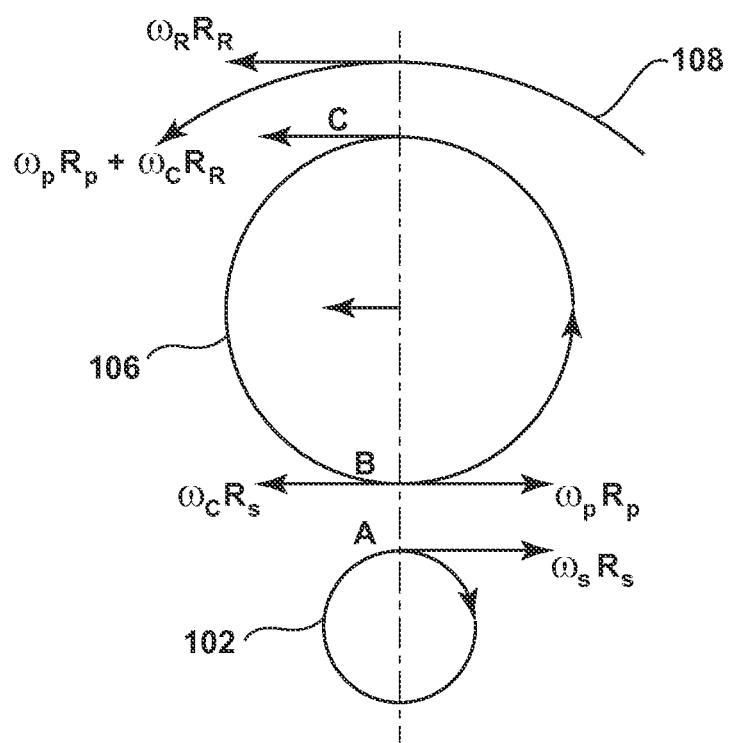
FIG. 6 schematically illustrates a speed relationship of the gear train of FIG. 3.

In another example, if the sun gear 102 rotates in the clockwise direction, the ring gear 108 rotates in counter-clockwise direction and both the planetary gear 106 and the planet carrier 110 rotate in counter-clockwise direction. In such an example, the ring gear 108 has more power than the sun gear 102. As schematically illustrated in FIG. 6, point A on the pitch diameter of the sun gear 102 has a tangential velocity of $\omega_s R_s$. The point A on the sun gear 102 pitch diameter is meshing with a point B on the planetary gear 106 pitch diameter which has a tangential velocity made up of two components, $\omega_p R_p - \omega_c R_s$. Since point A on the sun gear 102 meshes with point B on the planetary gear 106, they must have the same tangential velocities, therefore:

$$\omega_s R_s = \omega_p R_p - \omega_c R_s \quad (7)$$

The similar equation may be written for point C on the planetary gear 106 and the ring gear 108:

$$\omega_R R_R = \omega_c R_R + \omega_p R_p \quad (8)$$

Combining equation (7) and (8), the planet carrier 110 speed is:

$$\omega_c = \frac{R_R}{R_s + R_R}\omega_R - \frac{R_s}{R_s + R_R}\omega_s \quad (9)$$

Since the number of teeth N on a gear is proportional to the radius of its pitch circle; this means that the ratio of the radii R equals the ratio of the number of teeth N, that is:

$$\frac{\omega_A}{\omega_B} = \frac{R_B}{R_A} = \frac{N_B}{N_A} \quad (10)$$

Equations (3), (6) and (9) can be rewritten as more familiar forms as shown in Table 1 below:

| Driving Elements | Direction | Driving Elements' Output Power | Mechanical Advantage at Carrier |
|---|---|---|---|
| Sun and Ring | Same | | $\omega_C = \frac{N_S}{N_S + N_R}\omega_S + \frac{N_R}{N_S + N_R}\omega_R$ |
| | Opposite | Sun > Ring | $\omega_C = \frac{N_S}{N_S + N_R}\omega_S - \frac{N_R}{N_S + N_R}\omega_R$ |
| | | Sun < Ring | $\omega_C = \frac{N_R}{N_S + N_R}\omega_R - \frac{N_S}{N_S + N_R}\omega_S$ |

In the actuator 10, it has been determined that the gear ratio and the number of meshes will determine if the outputs are synchronized. In such an instance, the sun gear and ring gear may rotate in the same direction, both drivers run in the same direction, and the linking gear trains have an even number of meshes. The first actuating channel 30 has the output $\omega_{CA}$ as follows:

$$\omega_{CA} = \frac{N_s}{N_s + N_R}\omega_A + \frac{N_R}{N_s + N_R} \times GR_B \times \omega_B \quad (11)$$

The second actuating channel 40 has the output $\omega_{CB}$ as follows:

$$\omega_{CB} = \frac{N_s}{N_s + N_R}\omega_B + \frac{N_R}{N_s + N_R} \times GR_A \times \omega_A \quad (12)$$

In order to synchronize the output from both channels, meaning $\omega_{CA} = \omega_{CB}$. That is:

$$\frac{N_s}{N_s + N_R}\omega_A + \frac{N_R}{N_s + N_R} \times GR_B \times \omega_B = \frac{N_s}{N_s + N_R}\omega_B + \frac{N_R}{N_s + N_R} \times GR_A \times \omega_A$$

Simplify above, it yields, $$N_s(\omega_A - \omega_B) - N_R(\omega_A GR_A - \omega_B GR_B) = 0$$

Let $GR_A = GR_B = GR$, then $$(\omega_A - \omega_B)(N_s - N_R GR) = 0$$

To ensure above equation equal to zero, $(N_s - N_R GR)$ must equal zero. This yield, $$GR = \frac{N_s}{N_R}$$

That is:

$$GR_A = GR_B = \frac{N_s}{N_R} \quad (13)$$

Substitute $GR_A$ and $GR_B$ in (11) and (12) with equation (13), the following two equations are obtained:

$$\omega_{CA} = \frac{N_s}{N_s + N_R}\omega_A + \frac{N_R}{N_s + N_R} \times \frac{N_s}{N_R} \times \omega_B \quad (14)$$

And $$\omega_{CB} = \frac{N_s}{N_s + N_R}\omega_B + \frac{N_R}{N_s + N_R} \times \frac{N_s}{N_R} \times \omega_A \quad (15)$$

Simplify both equation (14) and (15), they become:

$$\omega_{CA} = \frac{N_s}{N_s + N_R}(\omega_A + \omega_B) \quad (16)$$

And $$\omega_{CB} = \frac{N_s}{N_s + N_R}(\omega_B + \omega_A) \quad (17)$$

In this manner, both channels have an identical output. Thus, as long as the first actuating channel 30 and the second actuating channel 40 have two identical planetary gear systems, two identical linking gear trains with an even number of meshes linked in between, and the drivers run in the same direction, regardless of the motor speed and the reflected load, they will have identical outputs.

If motors 12 and 14 run in opposite directions, with even meshes between the two channels, the sun gear 102 and ring gear 108 will also run in opposite directions. If the two motors have identical performance, i.e. exactly the same parameters, with more load reflected at the first motor, the first motor will output more torque and less speed while the second motor will output less torque and more speed. It is hard to determine which motor outputs more power. In reality, any two identically designed motors may vary in performance by as much as 10%. Thus, it will be even more difficult to know which motor outputs more power and the output direction of the planet carrier will be unpredictable.

The same method presented above may be applied to prove that an actuator with an odd number of meshes gear train and with motors rotate in the opposite direction regardless of the load reflected at the motor, the outputs of the two channels will be synchronized but in opposite directions.

The same method presented above may be applied to prove that an actuator with an odd number of meshes gear train and with motors rotate in the same direction, the outputs direction of the two channels will be unpredictable.

The above described embodiments provide for a variety of benefits including that the single actuator provides mechanically synchronized outputs. In addition to synchronizing the outputs, the above described embodiments provide partial redundancy allowing the actuator to still have synchronized outputs even if a driver fails.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An actuator comprising:
   a first actuating channel having a first planetary gear system, with a first sun gear and a first ring gear, and a first motor driving the first sun gear;
   a second actuating channel having a second planetary gear system, with a second sun gear and a second ring gear, and a second motor driving the second sun gear;
   a first gear train coupling the first motor to the second ring gear to drive the second ring gear in addition to the first sun gear; and
   a second gear train coupling the second motor to the first ring gear to drive the first ring gear in addition to the second sun gear;
   wherein the first motor driving both the first sun gear and the second ring gear in combination with the second motor driving both the second sun gear and the first ring gear mechanically synchronizes the first and second actuating channels.

2. The actuator of claim 1 wherein the first planetary gear system and the second planetary gear system have identical size and gear ratios.

3. The actuator of claim 2 where the first gear train and the second gear train have an even number of meshes.

4. The actuator of claim 3 wherein the first motor and the second motor operate in the same direction.

5. The actuator of claim 4 wherein a speed of the first motor and a speed of the second motor are different.

6. The actuator of claim 4 wherein a reflected load at the first motor and a reflected load at the second motor are different.

7. The actuator of claim 2 where the first gear train and the second gear train have an odd number of meshes.

8. The actuator of claim 7 wherein the first motor and the second motor operate in the opposite direction.

9. The actuator of claim 8 wherein a speed of the first motor and a speed of the second motor are different.

10. The actuator of claim 8 wherein a reflected load at the first motor and a reflected load at the second motor are different.

11. The actuator of claim 1, further comprising a braking mechanism configured to brake at least one of the first motor and the second motor upon failure of the at least one of the first motor and the second motor.

12. A method of mechanically synchronizing two outputs of a two channel actuator, having a first actuating channel with a first driver and a second actuating channel with a second driver, comprising:
   linking an output of a first motor and a ring gear of the second channel with a gear train having an even number of meshes;
   linking an output of a second motor and a ring gear of the first channel with a gear train having an even number of meshes; and
   rotating the drivers in the same direction to synchronize the two outputs in a same direction.

13. The method of claim 12 wherein the first and second actuating channels consist of two identical planetary gear systems.

14. A method of mechanically synchronizing two outputs of a two channel actuator, having a first actuating channel with a first driver and a second actuating channel with a second driver, comprising:
   linking an output of a first motor and a ring gear of the second channel with a gear train having an odd number of meshes;
   linking an output of a second motor and a ring gear of the first channel with a gear train having an odd number of meshes; and
   rotating the drivers in the opposite direction to synchronize the two outputs in opposite directions.

15. The method of claim 14 wherein the first and second actuating channels consist of two identical planetary gear systems.

16. The method of claim 15, further comprising braking one of the first driver and the second driver upon a failure of the one of the first driver and the second driver.

* * * * *